US006705664B1

(12) United States Patent  
Lahutsky

(10) Patent No.: US 6,705,664 B1
(45) Date of Patent: Mar. 16, 2004

(54) PORTABLE SHADE CANOPY FOR PERSONAL VEHICLES

(76) Inventor: Tammy Jane Smith Lahutsky, 2908 Khyber Pass, Plano, TX (US) 75075

( * ) Notice: Subject to any disclaimer, the term of this patent is extended or adjusted under 35 U.S.C. 154(b) by 0 days.

(21) Appl. No.: 10/237,356

(22) Filed: Sep. 9, 2002

(51) Int. Cl.$^7$ .............................................. E04H 15/06
(52) U.S. Cl. .............................. 296/136.12; 135/88.07; 135/88.16
(58) Field of Search .................... 135/88.01, 88.05, 135/88.07, 88.03, 88.08, 88.16, 119; 296/95.1, 77.1, 136.01, 136.1, 136.11, 136.12; 160/370.21

(56) References Cited

U.S. PATENT DOCUMENTS

| | | | |
|---|---|---|---|
| 2,508,757 A | | 5/1950 | Gray |
| 2,539,951 A | * | 1/1951 | Hall |
| 2,571,362 A | * | 10/1951 | Hervey |
| 2,849,012 A | * | 8/1958 | Cohen et al. |
| 2,874,709 A | * | 2/1959 | Cohen et al. |
| 3,055,381 A | * | 9/1962 | Zielinski |
| 3,143,123 A | | 8/1964 | Boor |
| 3,349,784 A | | 10/1967 | Roberts |
| 3,929,147 A | * | 12/1975 | Roscoe |
| 3,952,758 A | | 4/1976 | Addison et al. |
| 4,184,501 A | | 1/1980 | Johnson |
| 4,209,197 A | * | 6/1980 | Fischer ........................ 296/136 |
| 4,305,415 A | * | 12/1981 | Galli |
| 4,432,581 A | * | 2/1984 | Guma ........................ 296/136 |
| 4,605,030 A | * | 8/1986 | Johnson ........................ 296/136 |
| 4,655,236 A | | 4/1987 | Doramé et al. |
| 4,684,165 A | * | 8/1987 | Becker ........................ 296/136 |
| 4,805,654 A | * | 2/1989 | Wang ........................ 296/136 |
| 4,825,889 A | * | 5/1989 | Monteith ........................ 296/136 |
| 4,858,985 A | * | 8/1989 | Wojcik ........................ 296/136 |
| 4,886,083 A | | 12/1989 | Gamache |
| 4,944,321 A | * | 7/1990 | Moyet-Ortiz ............... 296/136 |
| 4,971,384 A | | 11/1990 | Baldwin |
| 5,040,557 A | * | 8/1991 | Morgan ........................ 135/88 |
| 5,240,305 A | * | 8/1993 | Trethewey ................... 296/136 |
| 5,241,977 A | * | 9/1993 | Flores et al. .................... 135/88 |
| 5,287,871 A | | 2/1994 | Trice |
| 5,401,074 A | * | 3/1995 | Timerman ................... 296/136 |
| 5,512,347 A | * | 4/1996 | Chu ............................. 428/81 |
| 5,522,409 A | | 6/1996 | May |
| 5,579,796 A | | 12/1996 | Mallo et al. |
| 5,605,030 A | | 2/1997 | Rodocker |
| 5,738,403 A | * | 4/1998 | Tyson ........................ 296/136 |
| 5,809,700 A | * | 9/1998 | Roush et al. ................ 135/119 |
| 5,921,259 A | * | 7/1999 | Ehler ........................ 135/119 |
| 6,035,874 A | | 3/2000 | Po-Chang |
| 6,250,320 B1 | * | 6/2001 | Roth ........................... 135/119 |
| 6,257,259 B1 | | 7/2001 | Ardouin |
| 6,260,566 B1 | * | 7/2001 | LaFave et al. ........... 135/88.01 |
| 6,263,893 B1 | * | 7/2001 | Spinella et al. .......... 135/88.01 |

* cited by examiner

Primary Examiner—D. Glenn Dayoan
Assistant Examiner—H. Gutman
(74) Attorney, Agent, or Firm—Harold Levine, P.C.

(57) ABSTRACT

A portable shade canopy or awning is specially adapted for personal vehicles. Supporting members are made of strong, lightweight and inexpensive material such as aluminum alloy, plastic, or composite; and the canopy material itself preferably is either soft and paint protective or other inexpensive material with paint-protecting material on the underside and with four grommets disposed in a generally rectangular configuration. An easily detachable clip is installed on each of four windows in a generally rectangular configuration. This is easily accomplished through use of clips having recessed reliefs that fit on the tops of the window glass so that when the windows are rolled up (i.e., closed), each clip is set firmly in place. Four detachable legs are provided to provide principal support for the canopy. The bottoms of these legs are disengageably attached to mating parts of the clips and thus are firmly supported. When the canopy is put in place over the top of the passenger compartment, the four grommets are placed over the tops of the four legs so that the tops of the legs project upwardly through the grommets to hold the canopy in place.

15 Claims, 3 Drawing Sheets

PORTABLE SHADE CANOPY FOR PERSONAL VEHICLES

This invention relates to portable shade canopies and more particularly to portable shade canopies especially adapted for personal vehicles.

BACKGROUND OF THE INVENTION

Portable shade canopies have heretofore been proposed, illustrative of which are those described in U.S. Pat. Nos. 6,257,259; 6,035,874; 5,605,030; 5,579,796; 5,287,871; 5,241,977; 5,522,409; 4,971,384; 4,886,083; 4,655,236; 4,184,501; 3,952,758; 3,349,784; 3,143,123; and 2,508,757.

Other proposals have been made for portable shade canopies, illustrative of which are British Patent 1,380,412; and Australian Patent 290,384.

Although such proposals have addressed selected problems encountered in erecting, using and disassembling portable shade canopies for automobiles, there yet have remained certain unresolved drawbacks to their use. Thus, among other problems, there have continued to be disadvantages with use of prior art devices. Such disadvantages include various ones of the following:

1. The vehicle to be shaded has to be driven onto the supporting legs.
2. Canopy materials are too bulky to conveniently fold up and store in the trunk.
3. Attachments are for car designs no longer found on the market such as bumper rims and rims above car windows.
4. Materials don't allow for water drainage
5. Frames are excessively bulky.
6. Susceptibility to paint damage from deployment and use.
7. Excessively time-consuming to erect.

Accordingly, there has continued to be a need for an improved construction that provides for convenient storage and rapidity and ease of deployment while concurrently featuring light weight, wind resistance and effective shade for automobiles.

BRIEF SUMMARY OF THE INVENTION

The improved devices according to the invention hereof include simple and cost effective features that ameliorate adverse conditions and characteristics heretofore associated with prior use and conditions. Thus, in accordance with the preferred embodiment hereof, at least four legs are provided in a main frame which features simplicity of erection and use in a style that connects to car windows. In this preferred embodiment provision is made to employ adjustable height legs, e.g., antennae-type rods, optional rubberized slides to deploy non-scratch barriers between legs and vehicle painted surfaces, deployment of selected hinges or springs, rubber and/or foam coatings on undersides of canopies to protect paint, shade extension flaps, lightweight shade materials with drain holes and ultra-violet resistance, and quick connect/disconnect supports.

Thus, the preferred embodiment includes a portable shade canopy assembly for a vehicle, the vehicle having a passenger compartment with a windshield, rear window and side windows, and wherein the canopy assembly comprises: a member of sheet material having a main body with at least four principal spaced-apart support locations and being adapted for disposition as a shade canopy for a vehicle, the support locations being spaced apart in a generally rectangular configuration, the member of sheet material being coated on its underside with paint-protecting material; four adjustable length legs, the legs being severally connectable to the four support locations; the legs having at their lower extremities feet adapted for engagement with supporting members; and a plurality of first arms, one of the first arms extending outwardly from each of the legs and substantially at right angles thereto, the first arms being positionable to extend outwardly from the passenger compartment thereby to extend sheet material beyond the passenger compartment. The preferred embodiment further includes a second arm extending from each of the legs and at right angles thereto, the second arms extending radially from the legs at predetermined angles with respect to the first arms.

OBJECTS AND FEATURES OF THE INVENTION

It is one general object of the invention to improve portable shade canopies for personal vehicles;

It is another object of the invention to facilitate deployment of portable shade canopies for personal vehicles;

It is yet another object of the invention to reduce cost and complexity of such portable shade canopies;

It is yet another object of the invention to reduce vulnerability of automobiles to damage when employing portable shade canopies therefor;

It is still another object of the invention to reduce bulk through utilization of lighter weight materials; and It is yet another object of the invention to facilitate water drainage when utilizing the portable shade canopies.

Accordingly, in accordance with one feature of the invention, four simple and easy-to-install supports (e.g., adjustable length legs) are provided, thereby facilitating rapid deployment or removal.

In accordance with another feature of the invention, positionable arms are provided and extend from the foregoing supports, thus providing for configuration of the canopy to include desired clearance from a shaded vehicle and facilitating circulation of air between the vehicle and canopy.

In accordance with still another feature of the invention, awning-like flaps are included, thus enhancing shading of a vehicle and protection of windows from external moisture.

In accordance with yet another feature of the invention, quick connect/disconnect connectors are provided between the aforementioned supports and the shaded vehicle, thus further facilitating deployment.

In accordance with still another feature of the invention, springs are provided within the supports thereby to facilitate deployment and integrity during adverse weather conditions.

These and other objects and features of the invention will be apparent from the following description, by way of example of a preferred embodiment, with reference to the drawing.

DESCRIPTION OF A PREFERRED EMBODIMENT

Figure 1:
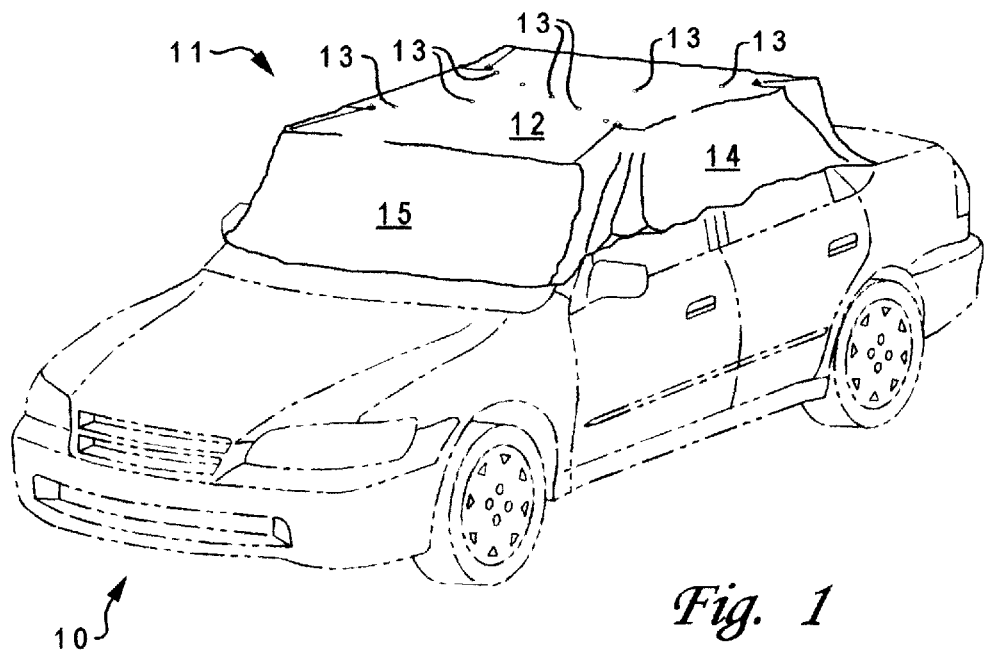
FIG. 1 is a perspective drawing showing an automobile on which there is mounted a shade canopy constructed and deployed in accordance with the principles of the invention.

Now turning to the drawing, and more particularly FIG. 1 thereof, it will be seen to be a perspective drawing showing an automobile on which there is mounted a shade canopy constructed and deployed in accordance with the principles of the invention. There, in FIG. 1, are seen a conventional automobile 10 which, for the purposes of illustrating the preferred embodiment, is a four-door sedan. However, it should be noted that the principles hereof are also applicable to many other types of vehicles.

Over the top of vehicle 10 there is disposed a shade canopy 11 having a generally rectangular top section 12 with a plurality of weep holes 13 to permit rain water to drain. On the driver's side is an awning-like flap 14 extending down from the rectangular top section 12 and maintained at a predetermined spacing from the vehicle by four adjustable length legs and their pairs of arms (described below in connection with FIGS. 2–4), one of each pair of arms extending outwardly from each of the legs and substantially at right angles thereto to extend sheet material beyond the passenger compartment. Also included in each pair of arms is a second arm extending from each of the legs and at right angles thereto, the second arms extending radially from the legs at predetermined angles with respect to the first arms. On the passenger side of the vehicle, an awning-like flap similar to flap 14 is provided to shield the passenger side windows.

Further reference to FIG. 1 reveals the presence of another awning-like flap 15 which extends out over the underlying windshield sufficiently to substantially cover it. A similar flap extends over the rear window to provide shielding therefor.

To provide support for the canopy and to maintain a predetermined clearance between it and the adjacent surfaces of the vehicle, there are preferably provided four adjustable length legs (FIG. 2) 16a–16d which are preferably positioned in a generally rectangular configuration; in a conventional passenger vehicle, one at, or adjacent, each of the four windows. Each of these legs includes two extending; arms 17a–d and 18a–d which: preferably are of different lengths (as shown) and which respectively extend the overlying canopy material corresponding distances outwardly to create desired clearances from the underlying vehicle surfaces. At the lower extremity, i.e., the foot, of each of the legs 16a–16d, there is provided a support, e.g., support assemblies 20a–d, to maintain the legs and the canopy in the desired position. The supports are depicted in detail in FIGS. 3–4.

Figure 2:
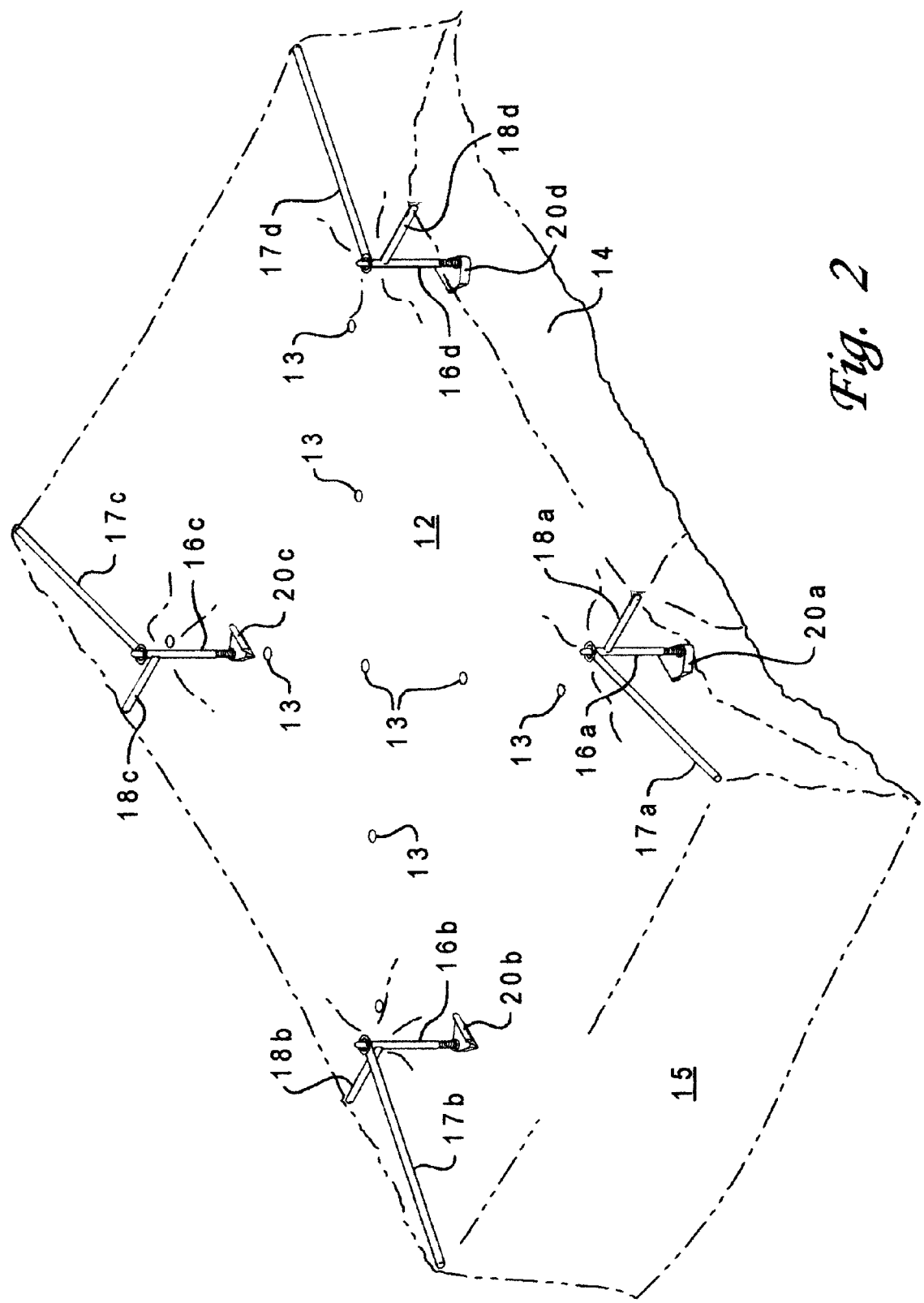
FIG. 2 is a perspective view depicting the four vertical supporting legs and laterally extending support rods as they appear when deployed, the shade canopy being shown in phantom.

It will be observed from further reference to FIG. 2 that the longer arms 17a–17d extend generally in parallel to the principal longitudinal axis of the vehicle. However, they are pointed slightly outwardly (as shown) so as to cooperate with the overlying canopy to: (1) provide better shade coverage over the windshield; and (2) preferably provide at least some partial clearance between the corners of the canopy and the vehicle surfaces. At the same time, arms 18a–18d extend substantially at right angles to the principal longitudinal axis of the vehicle, and in so doing form an angle with respect to arms 17a–17d that approximates but is slightly less than 90 degrees.

As mentioned above, FIG. 3 is an exploded view depicting details of one of the rod-like legs 16 of FIG. 2 together with one of the support assemblies 20a–20d (which include elements 28 and 31) that are used to mount the rod-like adjustable-length legs to the window of an automobile. There, we see a principal section 21 comprising upper telescoping section 21b and lower telescoping section 21a. Fastened to section 21b is one of the aforementioned longer extending arms 17 and one of the shorter extending arms 18. These arms preferably are of cylindrical shape and are actually continuous in length but are shown along their lengths with circumferential breaks 17' and 18' which illustrate the fact that the arms actually are longer than shown. It should also be noted that legs 16, as well as arms 17 and 18 are preferably rubberized or coated with non-scratch material to facilitate in protecting the exterior finish of the protected vehicle. The canopy itself (unless made of soft paint protective material) also is preferably coated. (either in its entirety or at least on the under surface) with rubberized or other non-scratch material to further protect the exterior finish of the protected vehicle it will also be observed that the arms are disposed at an angle with respect to each other that is slightly less than 90 degrees. This is represented by arc 22 which is less than 90 degrees.

Figure 4:
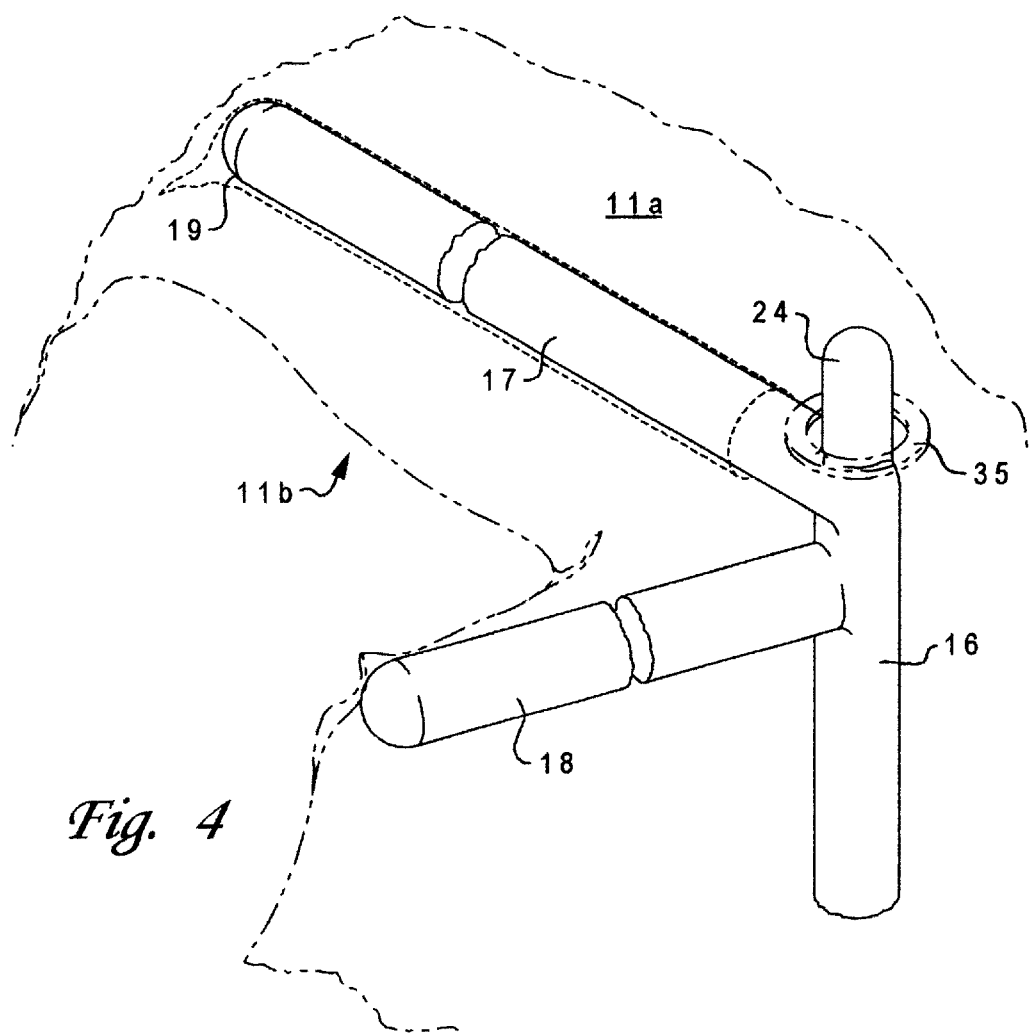
FIG. 4 is a perspective view depicting the support of the canopy by the extending support arms and connection to the vertical supporting legs.
Figure 3:
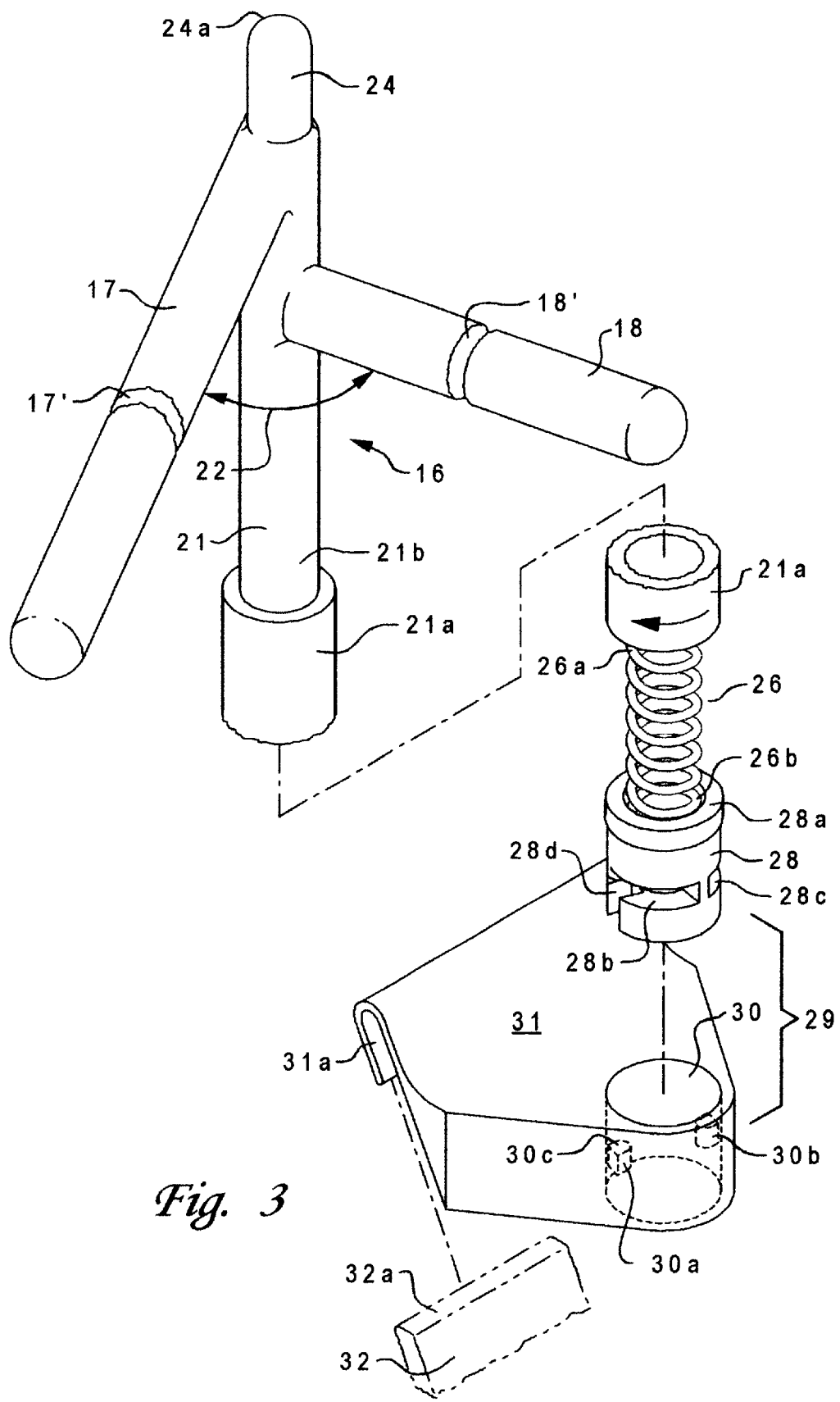
FIG. 3 is an exploded view depicting details of one of the legs of FIG. 2 together with a mounting assembly used to mount the leg to the window of an automobile.

Further reference to FIG. 3 reveals that upper extremity 24 of leg 16 is preferably smaller in diameter than the lower or principal part, although such is not required. By making the diameter of the upper extremity smaller and by curving the upper end 24a, fitting of grommets of the canopy thereover is facilitated (FIG. 4).

Further reference to FIG. 3 reveals the presence of a coil spring 26 that is fixed at its upper end 26a to the lower extremity 21a of leg 16, the lower end 26b being fixed to the upper end 28a of quick connect/disconnect support-connecting collar 28 of quick connect/disconnect support-connecting assembly 29. By providing spring 26, deployment and use of the shade canopy is facilitated. Thus, for example, the spring renders the deployed canopy less susceptible to wind damage (as, for example, by permitting some sway), and it also facilitates maintenance of the canopy with desired geometrical clearances from a shaded vehicle when the canopy is in use.

In the lower part of FIG. 3, there is depicted the quick connect/disconnect connector for facilitating rapid deployment of the shade canopy. Quick connect/disconnect support-connecting assembly 29 includes upper section, or collar 28 and lower section, or receiving recess 30 which in the preferred embodiment is molded or otherwise formed within vehicle window clip 31. The quick connect/disconnect connector per se, is well known in the art and has found acceptance in such applications as flying flags from windows of automobiles. However, it does not appear to have been employed to provide quick release (i.e., quick connect/disconnect) support or connection for applications such as those envisioned herein.

Further reference to FIG. 3 reveals that the window clip 31 includes a recess 31a which is adapted to fit over the upper part 32a of the glass in a typical vehicle window 32 (for ease of illustration, the window being shown smaller than normal). Thus, when clip 31 in set in place on the upper rim of the vehicle window, support is provided therefor, support that has been found to be sufficient normally to hold the canopy in place.

Within recess 30 there are disposed two protuberances projecting inwardly from the otherwise cylindrical inner surface of the recess. These cooperate respectively with slots 28b and 28c of connecting collar 28. Thus when it is desired to disengageably connect collar 28 to window clip 31, collar 28 is moved downwardly such that projection 30a is aligned with and enters vertical slot 28d. When the upper surface 30c contacts the upper surface of slot 28b, collar 28 is partially rotated so that projection 30a enters horizontal slot 28b and is stopped when it reaches the end of slot 28b. Similar slots including slot 28c cooperate with projection 30b at the opposite side of collar 28 to complete the detachable mounting of the collar 28 to clip 31 and thus complete mounting of the leg 16 and its connecting arms 17 and 18.

As mentioned above, FIG. 4 is a perspective view illustrating the support of the canopy by the extending support arms and the connection of the canopy to the vertical supporting legs. There, in FIG. 4 are seen a part 11a of shade canopy 11 overlying and being supported by arms 17, 18 and leg 16, the underside of the shade canopy 11 having a paint protecting material surface 11b. To properly position the canopy, there are provided at least four apertures therethrough; each aperture being defined and reinforced by an annular ring such as ring 35. As shown in the drawing, when the canopy is deployed, the upper extremeties 24 of the legs 16 project through the ring openings thus defining the generally rectangular disposition of the canopy to which reference is made above. Where windy conditions are expected, pockets or other fasteners preferably are included to overtly fasten the canopy to the legs and arms (e.g., pockets represented by pocket 19 in FIG. 4) into which the legs extend. However, in its simplest form the canopy merely overlies the arms 17 and 18.

It will now be evident that there has been described herein an improved and simplified shade canopy assembly for use with vehicles such as automobiles. It will also be evident that by provision and disposition of pairs of arms extending from each of four essentially vertical supports, clearance from and protection of vehicle surfaces is facilitated. Furthermore, by including springs in the principal vertical supports and by including quick release type connectors, deployment is simplified and facilitated.

Although the invention hereof has been described by way of a preferred embodiment, it will be evident that adaptations and modifications may be employed without departing from the spirit and scope thereof For example, other mounting brackets may be employed, or the vertical support legs could be extended to lower parts of the vehicle or even to the ground.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A portable shade canopy assembly for a vehicle, said vehicle having a passenger compartment with a windshield, rear window and side windows, said canopy assembly comprising:
   (a) a member of sheet material having a main body with at least four principal spaced-apart support locations and being adapted for disposition as a shade canopy for said vehicle, said support locations being spaced apart in a generally rectangular configuration, said member of said sheet material having a paint protective surface on the underside of said member of sheet material;
   (b) four adjustable length legs, said legs being severally connectable to said four support locations; said legs having at lower extremities of said legs feet adapted for engagement with four supporting members, said supporting members including window mounting clips; and
   (c) a plurality of first arms, one of said first arms extending outwardly from each of said legs and substantially at right angles thereto, said first arms being positionable to extend outwardly from said passenger compartment thereby to extend some of said sheet material beyond said passenger compartment.

2. A portable shade canopy assembly according to claim 1 wherein said canopy extends entirely over said passenger compartment.

3. A portable shade canopy assembly according to claim 1 wherein said support locations include supporting members and wherein said feet adapted for engagement with said supporting members include surfaces adapted for engagement with corresponding surfaces on said supporting members, said surfaces including slots and projections; whereby when said surfaces are engaged and said legs are partially rotated, said legs disengageably lock to said supporting members.

4. A portable shade canopy assembly according to claim 1 wherein said supporting members include clips having recesses adapted for receiving vehicle glass therein.

5. A portable shade canopy assembly according to claim 1 wherein said legs each include a second arm extending substantially at right angles to said leg, said second arms extending radially from said legs at predetermined angles with respect to said first arms.

6. A portable shade canopy assembly according to claim 5 wherein said second arms extend outwardly with respect to said passenger compartment thereby to further extend some of said member of sheet material beyond said passenger compartment.

7. A portable shade canopy assembly according to claim 1 wherein at said four principal spaced-apart support locations there are included grommets sized to slide over tops of said legs thereby disengageably to engage said member of sheet material with said legs.

8. A portable shade canopy assembly according to claim 1 wherein said member of sheet material includes a top and weep holes for facilitating drainage of water from said top of said member of sheet material.

9. A portable shade canopy assembly according to claim 1 wherein said member of sheet material includes a plurality of pockets sized to severally accept said first arms thereby to facilitate retention of said member of sheet material in position when said member of sheet material is deployed on said vehicle.

10. A portable shade canopy assembly for a vehicle, said vehicle having a passenger compartment with a windshield, rear window and side windows, said canopy assembly comprising:
   (a) a member of sheet material having a main body with;at least four principal spaced-apart support locations and being adapted for disposition as a shade canopy for said vehicle, said support locations being spaced apart in a generally rectangular configuration, said member of sheet material having an underside and
      i. being on its underside of paint-protecting material;
      ii. extending entirely over said passenger compartment;
      iii. having at said spaced-apart locations grommets sized to slide over tops of supporting legs;
      iv. having a plurality of weep holes;
      v. having a plurality of pockets for individually accepting supporting rods;
   (b) four adjustable length legs, said legs
      i. being severally connectable to said four support locations;
      ii. having at their lower extremities of said legs feet adapted for engagement with supporting members;

and wherein said feet include slots for facilitating disengageable connection with said supporting members;

(c) a plurality of first arms in the form of rods, one of said first arms extending outwardly from each of said legs and substantially at right angles thereto; said first arms being positionable to extend outwardly from said passenger compartment thereby to extend some of said sheet material beyond said passenger compartment.

11. A portable shade canopy assembly according to claim 10, wherein said legs each include a second arm extending substantially at right angles to said leg, said second arms extending radially from said legs at predetermined angles with respect to said first arms.

12. A method of deploying a portable shade canopy assembly on a passenger vehicle having a passenger compartment with at least four windows, said method comprising:

a. fastening four support clips to said windows, one to each of said four windows;

b. engaging four adjustable length legs to said four clips by inserting lower extremities of said legs into receiving recesses in said clips and turning said lower extremities through a part of an arc, said legs each having a top;

c. adjusting lengths of said legs;

d. disposing an awning over said passenger compartment and over said legs, said awning having four grommets spaced in a generally rectangular configuration;

e. positioning said awning to individually position said grommets over corresponding ones of said tops of said legs; and f. lowering said grommets to severally project tops of said legs through said grommets.

13. The method according to claim 12 further including providing four supporting arms individually projecting from said legs, one arm from each of said legs, and extending periphery of said awning outwardly from said passenger compartment over said arms.

14. The method according to claim 13 further including supporting said extending periphery of said awning by said supporting arms.

15. The method according to claim 14 further including providing a second arm projecting from each of said legs, disposing a part of said extending periphery of said awning over each said second arm, and supporting said part of said extending periphery by each said second arm.

* * * * *